US009319391B2

(12) United States Patent
Wentworth et al.

(10) Patent No.: US 9,319,391 B2
(45) Date of Patent: Apr. 19, 2016

(54) LAW ENFORCEMENT AGENCY PORTAL (71) Applicant: Level 3 Communications, LLC, Broomfield, CO (US)

(72) Inventors: Brett Wentworth, Broomfield, CO (US); Taylor Fraley, Erie, CO (US); Mike Keating, Thornton, CO (US); Dale Drew, Arvada, CO (US); John Fable, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 96 days.

(21) Appl. No.: 13/827,896

(22) Filed: Mar. 14, 2013

(65) Prior Publication Data

US 2014/0041017 A1 Feb. 6, 2014

Related U.S. Application Data

(60) Provisional application No. 61/677,864, filed on Jul. 31, 2012.

(51) Int. Cl.
*H04L 29/06* (2006.01)
*G06F 21/31* (2013.01)
*G06F 21/62* (2013.01)

(52) U.S. Cl.
CPC .............. *H04L 63/08* (2013.01); *G06F 21/31* (2013.01); *G06F 21/6218* (2013.01); *H04L 63/10* (2013.01); *H04L 63/20* (2013.01)

(58) Field of Classification Search
CPC ......... H04L 63/08; H04L 63/10; H04L 63/20; G06F 21/6218
USPC .................................................. 726/2–5, 17
See application file for complete search history.

(56) References Cited

U.S. PATENT DOCUMENTS

| | | | | |
|---|---|---|---|---|
| 6,954,526 | B1* | 10/2005 | Glenn et al. | 379/220.01 |
| 7,822,703 | B1* | 10/2010 | Rodriguez-Val | G06F 21/42 705/26.1 |
| 8,406,381 | B2* | 3/2013 | Jarosinski et al. | 379/37 |
| 8,650,628 | B2* | 2/2014 | Lam | G06F 21/41 726/8 |
| 2002/0007411 | A1* | 1/2002 | Shaked et al. | 709/229 |
| 2002/0049675 | A1* | 4/2002 | Kailamaki | G06Q 20/40 705/44 |
| 2002/0065682 | A1* | 5/2002 | Goldenberg | 705/2 |
| 2002/0120756 | A1* | 8/2002 | Lynam | G06Q 10/1091 709/229 |
| 2003/0119485 | A1* | 6/2003 | Ogasawara | 455/411 |
| 2003/0128822 | A1* | 7/2003 | Leivo | G06F 21/42 379/93.02 |
| 2006/0093107 | A1* | 5/2006 | Chien | H04L 12/14 379/114.01 |
| 2006/0141994 | A1* | 6/2006 | Fratti et al. | 455/414.1 |
| 2006/0218235 | A1* | 9/2006 | De Cnodder | 709/206 |
| 2006/0230039 | A1* | 10/2006 | Shull | H04L 63/08 |
| 2007/0041555 | A1* | 2/2007 | Marwell et al. | 379/218.01 |
| 2007/0053518 | A1* | 3/2007 | Tompkins | G06Q 20/12 380/270 |
| 2007/0150919 | A1* | 6/2007 | Morishita | H04N 21/235 725/35 |
| 2008/0010190 | A1* | 1/2008 | Rackley, III et al. | 705/39 |
| 2008/0192911 | A1* | 8/2008 | Seo | 379/142.06 |

(Continued)

*Primary Examiner* — Hadi Armouche
*Assistant Examiner* — Sher A Khan (57) ABSTRACT

Implementations of the present disclosure involve a system and/or method for providing account information for a telephone number. All users are authenticated to ensure they may access the account information. Once authenticated, the user provides one or more telephone numbers that they would like to retrieve account information for. The system searches for the telephone number and if found, checks to ensure that the telecommunications provider services the phone number. When the telecommunications provider is the provider for the phone number, the record is retrieved and sent to the user.

17 Claims, 5 Drawing Sheets

(56) References Cited

U.S. PATENT DOCUMENTS

| | | | |
|---|---|---|---|
| 2008/0294629 A1* | 11/2008 | Gonen et al. .................. 707/5 |
| 2009/0063474 A1* | 3/2009 | Curry et al. .................. 707/5 |
| 2009/0078758 A1* | 3/2009 | Crowell .................. 235/380 |
| 2011/0075818 A1* | 3/2011 | Vance et al. .................. 379/88.01 |
| 2011/0141947 A1* | 6/2011 | Li et al. .................. 370/259 |
| 2011/0238484 A1* | 9/2011 | Toumayan et al. .................. 705/14.39 |
| 2013/0024910 A1* | 1/2013 | Verma .................. H04L 63/08 726/3 |

* cited by examiner

LAW ENFORCEMENT AGENCY PORTAL

CROSS-REFERENCE TO RELATED APPLICATION

This application claims priority under 35 U.S.C. §119(e) to provisional patent application No. 61/677,864 titled "Law Enforcement Agency Portal" filed on Jul. 31, 2012 and which is hereby incorporated by reference herein.

TECHNICAL FIELD

Aspects of the present disclosure involve validating credentials, receiving a request, conducting a search, and responding to the request. More particularly, the present disclosure involves an automated data retrieval system capable of receiving a request for information related to a telephone number from a law enforcement or government agency, authenticating the identity of the requestor, performing a search for information relating to the telephone number, and providing a response.

BACKGROUND

Law enforcement agencies performing investigations are often only able to obtain limited information about suspects or others involved in a case. As part of their investigations, these agencies may be able to learn of telephone numbers connected to the investigation, but have no other information related to the telephone number such as the name of the person to which the number is assigned. This leads the agency to request information from one or more telecommunications providers. These telecommunications providers are then tasked with providing information associated with the accounts of the telephone numbers. The information generally includes conventional information associated with a telephone account, including the name of the person on the account, street address, account information, payment records, and other account history.

Currently, law enforcement agencies have no means of determining the particular telecommunication provider that is assigned a specific telephone number. This leads the law enforcement agencies blindly sending information requests to multiple telecommunications providers, hoping that one of them services the number. Telecommunications providers are thus inundated with requests for telephone account information that are for unrelated phone numbers. Furthermore, before a provider is even able to conduct a records search, the provider verifies the identity of the requestor and determines, whether the requestor is authorized to make the request. Thus, each records request, regardless of whether the request is related to a telephone number served by the telecommunications provider, requires the telecommunications provider to expend time and resources.

It is with these issues and problems in mind, among others, that various aspects of the present disclosure were developed.

SUMMARY

A system and method for automating the process for verifying the validity of a request by law enforcement agencies for retrieving data associated with one or more telephone numbers. The system and method has new users authenticate their membership in an authorized government agency using various credentials. Once a user has authenticated their credentials, the user may submit one or more telephone numbers to the system which in turn may retrieve information associated with the telephone number and send it to the user.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Aspects of the present disclosure involve allowing an authorized user to submit a request for information to a data retrieval system which authorizes the request, performs a search, and sends the user the requested information. Specifically, the present disclosure is directed towards law enforcement or similarly authorized government agencies requesting customer account records associated with a telephone number. These records are kept by a telecommunication provider which provides services to the requested phone number as well as other phone numbers. The telephone number account records are generally stored in one or more databases and may contain information associated with the customer's account, such as names, addresses, service information, and payment information. The agency may need this information for various reasons, and telecommunication providers are tasked with providing this information in a reasonably quick and efficient manner.

Figure 1:
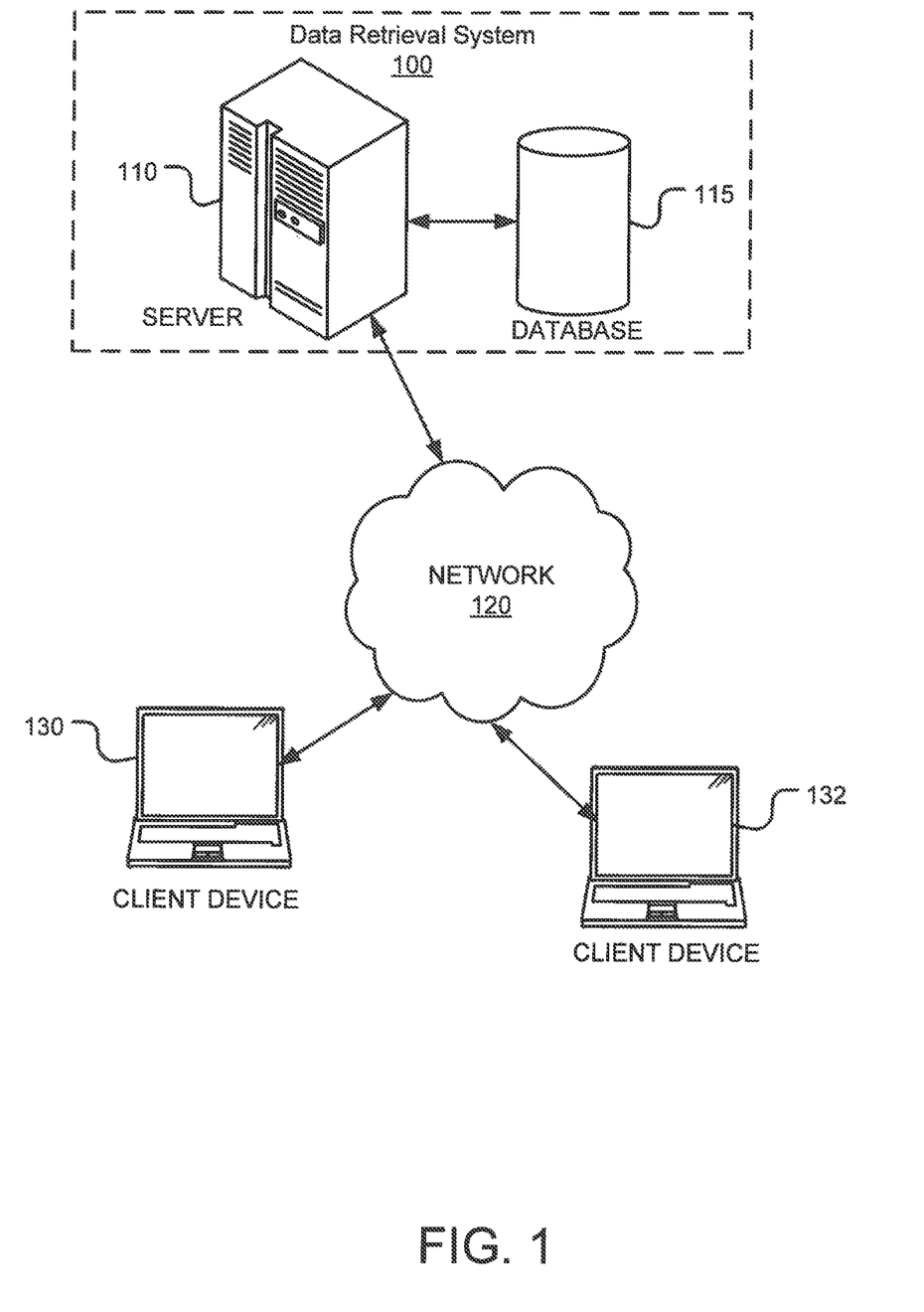
FIG. 1 depicts an example system for the automated data retrieval system configured to retrieve phone customer records.

Referring to FIG. 1, a data retrieval system 100 is depicted. In this example, the data retrieval system 100 is capable of receiving requests for account information associated with phone numbers from one or more clients 130, 132 and providing the clients 130, 132 with a response that either provides the clients with either direct or in-direct access to their requested data, a denial of their request, or a prompt requiring the client 130, 132 to provide more information using a formal registration procedure. In various embodiments, the data retrieval system 100 may include one or more servers 110 that are connected to at least one database 115 storing customer account information. The server 110 may include any general purpose server that is capable of connecting to the network 120 and process requests, as well as either operate the database 115 or connect to the database 115. In various embodiments, the database 115 may be configured to access customer account information such as the account owner names, addresses, and payment information when queried with a phone number.

The various client devices 130, 132 include any conventional computing devices such as personal computers, laptops, tablet computers, or smart phones capable of connecting to the data retrieval system 110 using the network 120. The network 120 may include any computing network or combination of multiple computing networks capable of relaying communications between the data retrieval system 100 and the client devices 130, 132. For example, the network 120 may include the Internet and the client devices 130, 132 may be connecting to Internet via a home network, a public network, or an employer's network. In various other embodiments, the network may also include telephone and cellular networks.

Figure 2:
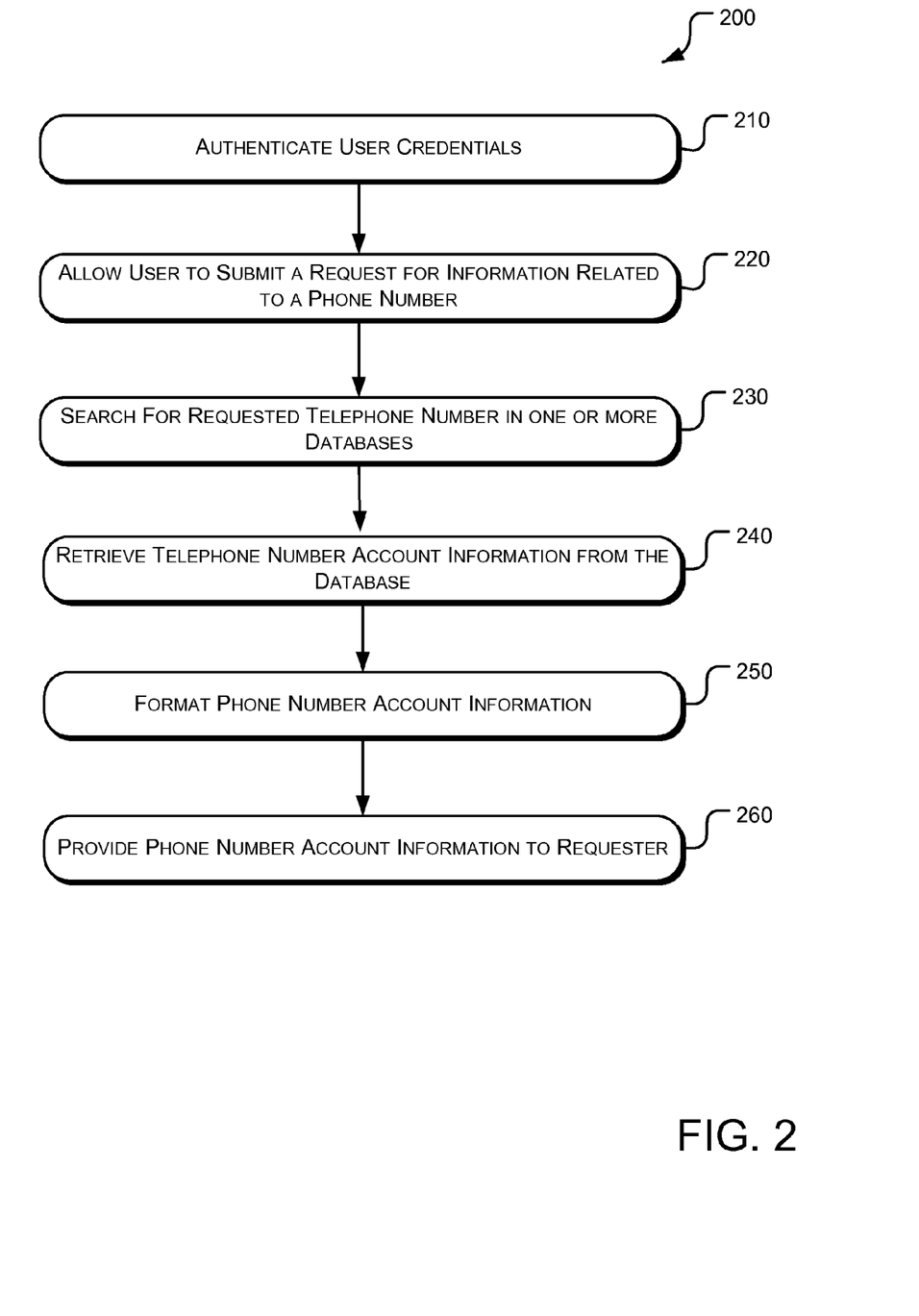
FIG. 2 depicts a flow chart illustrating the functions of the data retrieval system retrieving information related to a telephone number.

Referring now to FIG. 2 and the system of FIG. 1, a method of data retrieval is depicted. In this example, the data retrieval system 100 may be configured to operate securely by only allowing authorized users to access the database 115. For example, the system may authenticate a user's identity or membership in an authorized agency to ensure that the user is authorized to receive the requested information (operation 210). The authentication method used by the data retrieval system 100 may include any method for authenticating a user's identity and verifying that the user is authorized to access the data.

For example, a user may be required to provide credentials to authenticate the user. The credentials may be authenticated using a variety of techniques. For example, each user may be assigned unique login credentials such as a username and password combination, a login token, or any other means of electronic authentication. After entering the credentials, such as through a web page displayed in a browser window, the system compares the credentials against known valid credentials, and either allows or denies access to the system. If a user does not have any of these credentials, the user may be required to go through a registration process in order to use the data retrieval system.

First time users of the system may be required to register before they can access and use the system. The registration process may include any system for identity verification or user authentication and may be completed using electronic forms, paper forms, in-person interviews, or some combination of mechanisms to confirm the identify of the new user, and to ensure that the user is authorized to receive the information. For example, the authentication and registration processes may be designed to confirm that the user is a member of a group authorized to use the data retrieval system 100 as well as provide the user with login credentials for future use of the data retrieval system 100. Authorized groups may include law enforcement agencies, government agencies, and other agencies or groups that may have a legitimate purpose for accessing the information.

In some instances, the process of issuing authentication credentials may require analysis to be done manually by a person. For example, if the system provides access to highly sensitive information that requires extra security or if the user identity cannot be accurately verified without in-person communication, an in-person interview of the prospective user may be required. In other instances, authentication credentials may be issued using automatic computer-based user verification steps, or semi-automatic, requiring a partially computer-based verification and some form of human verification. After the user has registered, he may be provided with authentication credentials that allow for the user to login to the system at any time. Alternately, the credentials may only be valid for a limited period of time or a limited number of uses.

In one example, authentication may be accomplished automatically by evaluating the user's email address. For example, the data retrieval system 100 may analyze the user's email address to determine if the user is authorized to access the data retrieval system 100. This evaluation may be done by examining the domain of the user's email address. For example, the user's domain may be compared to a list of authorized domains. If the domain of the email address is present on the authorized domain list, the user may be emailed a one-time-use token such as a one-time-use login user name and password or a hyperlink containing the one-time-use token that when followed, allows for access to the system. In each case, after the one-time-use token has been used, the token no longer allows access to the data retrieval system.

In another example, the access provided by email domain analysis may allow for registration and multiple future uses of the system. For example, a user with an email address of "user@xyz.gov" may provide his email address to the data retrieval system 100. The data retrieval system may recognize that the domain "xyz.gov" is a government agency that is authorized to use the system. The user may then be sent an email containing a login credential for accessing the system in the future or a hyperlink to a web page that allows the user to choose login credentials.

In some cases, a user may possess an email address from a domain that is not on the authorized domain list. In these cases, the user's credentials may be verified by another means, human or automated. This may include requiring the user to fax, email, or mail information to the provider for verification. After the user has been authorized, the user's email domain may be added to the authorized domain list. For example, a user from a small police department may have an email address with a domain that is not on the authorized domain list. After the provider has verified that the authenticity of police department and its domain, the provider may send an email to the user allowing access to the system and the police department's domain may be added to the authorized domain list.

Once the user's identity has been authenticated, the user's account may be compared to an access control list or similar device specifying which users have access to the data retrieval system 100, the database 115, or specific entries or portions of the database 115. Once it has been determined that the user may access the data retrieval system 100, the user may be provided a means to access the data retrieval system (operation 220). This may be done by redirecting the user's web browser to a website that allows access to the system, sending the user an email with a unique link and token for entry to the website, providing a token for allowing an application to connect to the system, or any other means of granting access to the data retrieval system. If the authentication system uses a login with a username and password, the user's browser may be directed to a webpage or web application that allows the user to process a request for information. In one example, the user may be emailed a unique web address comprising an access token. The unique web address may allow the user to access the data retrieval system a single time, multiple times, or may allow the user to submit a limited number of information requests.

Once a user has authenticated their identity and it has been determined that the user is authorized to access the database 115, the user may complete a request for account information related to one or more phone numbers in order to submit a request for information. This may be accomplished using an online form, application, email, or other means. The request may contain a list of one or more numbers and any specific information needed relating to the numbers. In one specific example, a web page may be presented in the user's browser with data fields for a user to enter the requested number. The page may also include various drop-down menus with data fields whereby a user can tailor or filter the requested information. For example, the drop-down may include a list of some or all available data fields associated with the phone number in the system, and only results for the selected data fields will be included.

Once a request has been received at the server 110, the server 110 may then search the database 115 for the one or more requested phone number and the corresponding account information (operation 230). When the requested telephone number is found in the telecommunications provider's database 115, any account information associated with the telephone number may be retrieved (operation 240). Alternatively, only the selected account information is retrieved. The raw account information retrieved from the database (or databases), may then be formatted into a standardized format that labels each piece of account information (operation 250). Alternately, the data may populate pre-labeled fields on a display web page. The formatted account information may then be sent to the user (operation 260).

Figure 3:
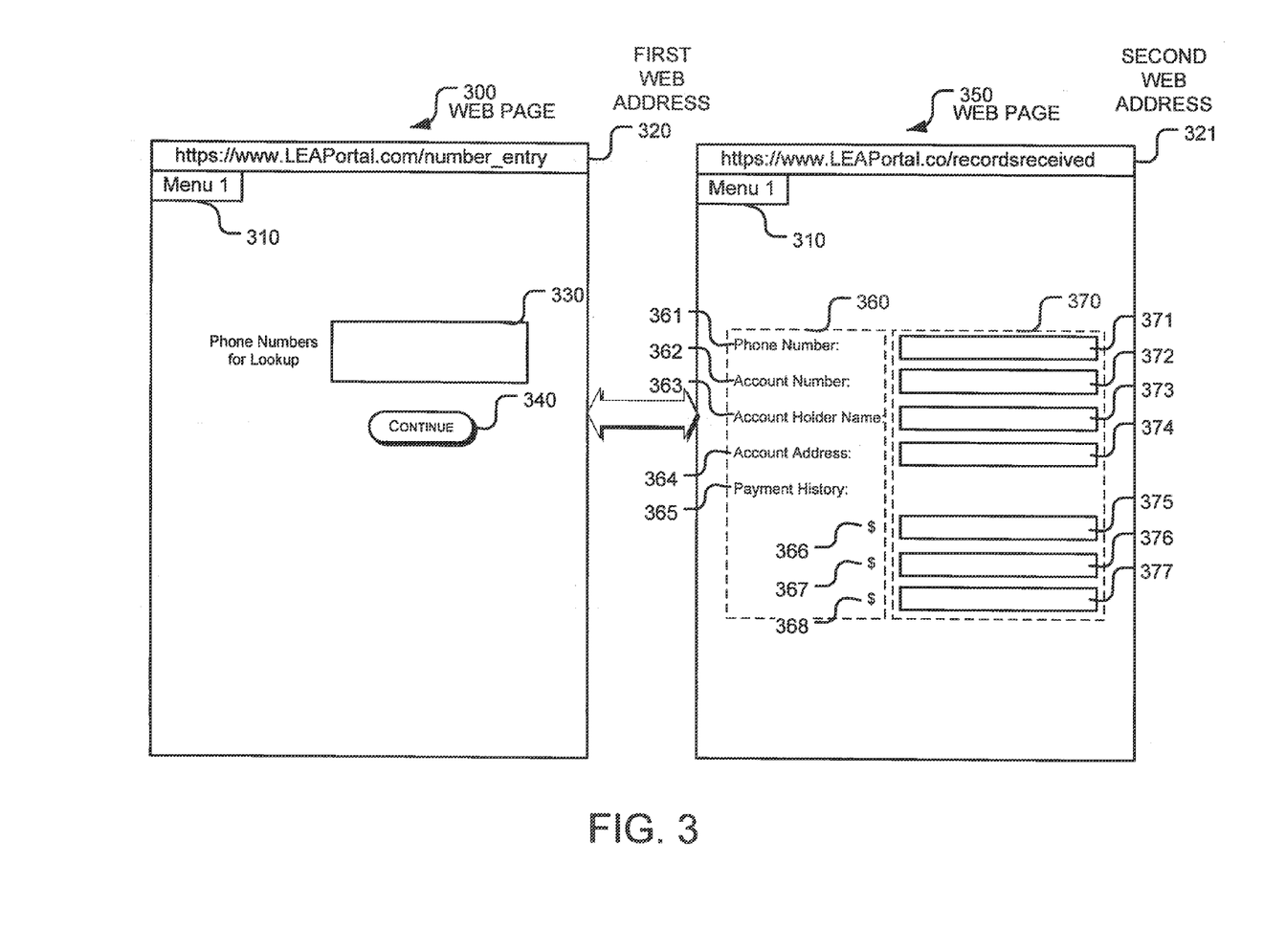
FIG. 3 depicts an example first web page for requesting data related to a telephone number and an example second web page illustrating formatted and labeled information retrieved from a database that is related to the telephone number.

Referring to FIG. 3, an example first web page 300 for providing telephone numbers for retrieval and a second web page 350 for displaying the retrieved account information are depicted. A web browser may be used to access both the first and second web pages 300, 350 at a first and second web address 320, 321. The web page 300 includes at least one data field 330 for a user to enter the requested number. The first web page 300 may also include one or more drop-down menus 310 for tailoring or filtering the requested information. Once the user has entered in the telephone number for retrieval, the user may prompt the system to conduct the search by selecting a "continue" or "search" button 340.

The retrieved results may be formatted into any format that allows the account information to be understandable. For example, the second web page 350 may be displayed in the user's browser as soon as the results have been retrieved. The second web page may include pre-designated fields for populating account information 370 from the account retrieved from the database. These pre-designated fields may also have accompanying labels that correspond to each piece of account information retrieved 360. The labels 360 include any labels or units of measure 360 required for understanding the retrieved account information 370-377. In this example, the labels include a phone number label 361, an account number label 362, an account holder name label 363, an account address label 364, and payment history labels 365-368.

Although, FIG. 3 provides an example using a web page, the results may be similarly formatted in a text file and then sent to the user using any appropriate means. This may include sending the results electronically via email, text message, or application, physically via mail or fax, or sent via telephone as a recorded message or using simulated speech. If the telephone number cannot be found in the database 115, the data retrieval system 100 may then notify the user that the requested number was not found. This may be done by electronically sending the user a message via email, or other method listed above, stating that the requested phone number was not found and is therefore not associated with the telecommunications provider.

Figure 4:
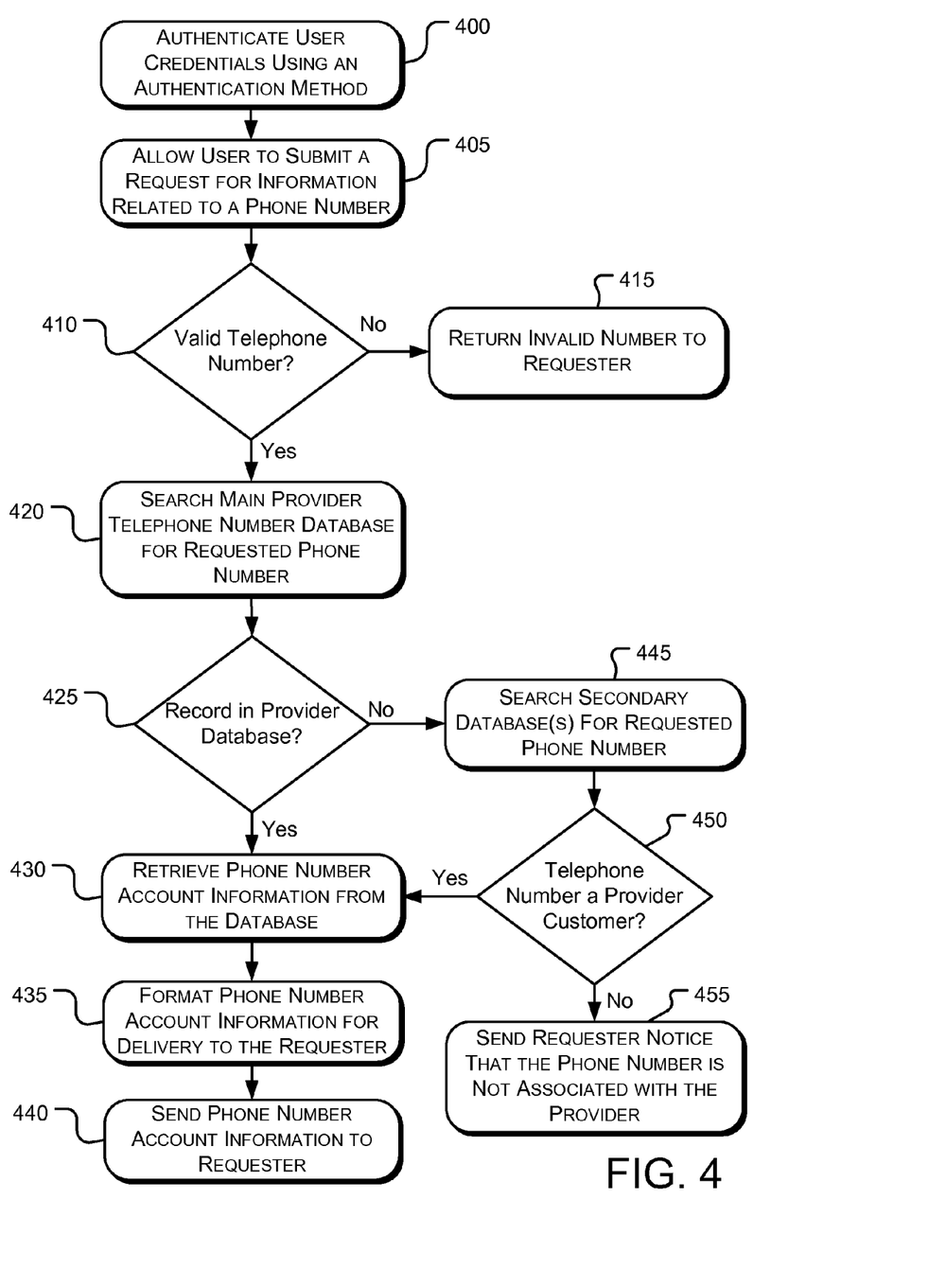
FIG. 4 depicts a flow chart illustrating an embodiment of the data retrieval system that utilizes multiple databases for finding information related to a telephone number.

Referring now to FIG. 4, an additional method of performing data retrieval by the data retrieval system 100 is depicted. A user wanting to access the data retrieval system 100 first authenticates his credentials and is provided access to the system according to one of the methods described herein (operation 400). Once the user has been authenticated, the user may submit an information request to the data retrieval system (operation 405). Before performing a potentially time consuming database search, the provided telephone number(s) may be examined to ensure that the telephone number(s) is a valid phone number (operation 410). This may be done by checking the length of the provided telephone number. For example, a valid U.S. number has ten or eleven digits depending on whether a leading "1" is included. The area code of the telephone number may be compared to valid area codes. The remaining seven digits may be checked for known invalid numbers, such as telephone numbers beginning with "555." If one or more of the numbers is not a valid phone number, the user may be alerted to the invalid number(s) (operation 415).

For valid numbers, the data retrieval system may search one or more of telecommunications provider's databases for the number (operation 420). If the number is located in the telecommunications provider's database, then any account information associated with the number may be retrieved from the telecommunications provider's database (operation 430) and formatted to ensure the account information is understandable such as by including any necessary labels and spacing (operation 435). For example, the system may add labels for identifying the each piece of the retrieved data.

The formatted account information may then be provided to the user via mail, email, fax, or web browser (440). In one example, the results may also be populated onto a secure webpage and a hyperlink may be sent to the user's email address.

In many cases, the requested telephone number will not be found in the telecommunications provider's database, for example because the telephone number is not serviced by the telecommunications provider, because the phone number is serviced by a subsidiary company, or because of an error entering data in the system. In these cases, the data retrieval system may be configured to search one or more outside or secondary databases for the telephone number (operation 445). These secondary databases may include databases of third parties such as other telecommunications providers and/or telecommunications agencies, databases that are shared by multiple telecommunications providers. If the requested telephone number is found in one the secondary databases, the information associated with the requested telephone number may be analyzed to verify whether the number is serviced or associated with the telecommunications provider (operation 450). Thus, the secondary databases provide an additional method of verifying whether the requested telephone number is in-fact serviced by the telecommunications provider.

If the requested telephone number is associated with the telecommunications provider, then the account information may be retrieved (operation 430), formatted (operation 435) and provided to the user (operation 440). If the requested telephone number is not associated with the telecommunications provider, the user is sent a message indicating that the provider is not associated with the number (operation 455). If no record of the number is found in the outside databases, then the user is informed that no record of the number was found.

Figure 5:
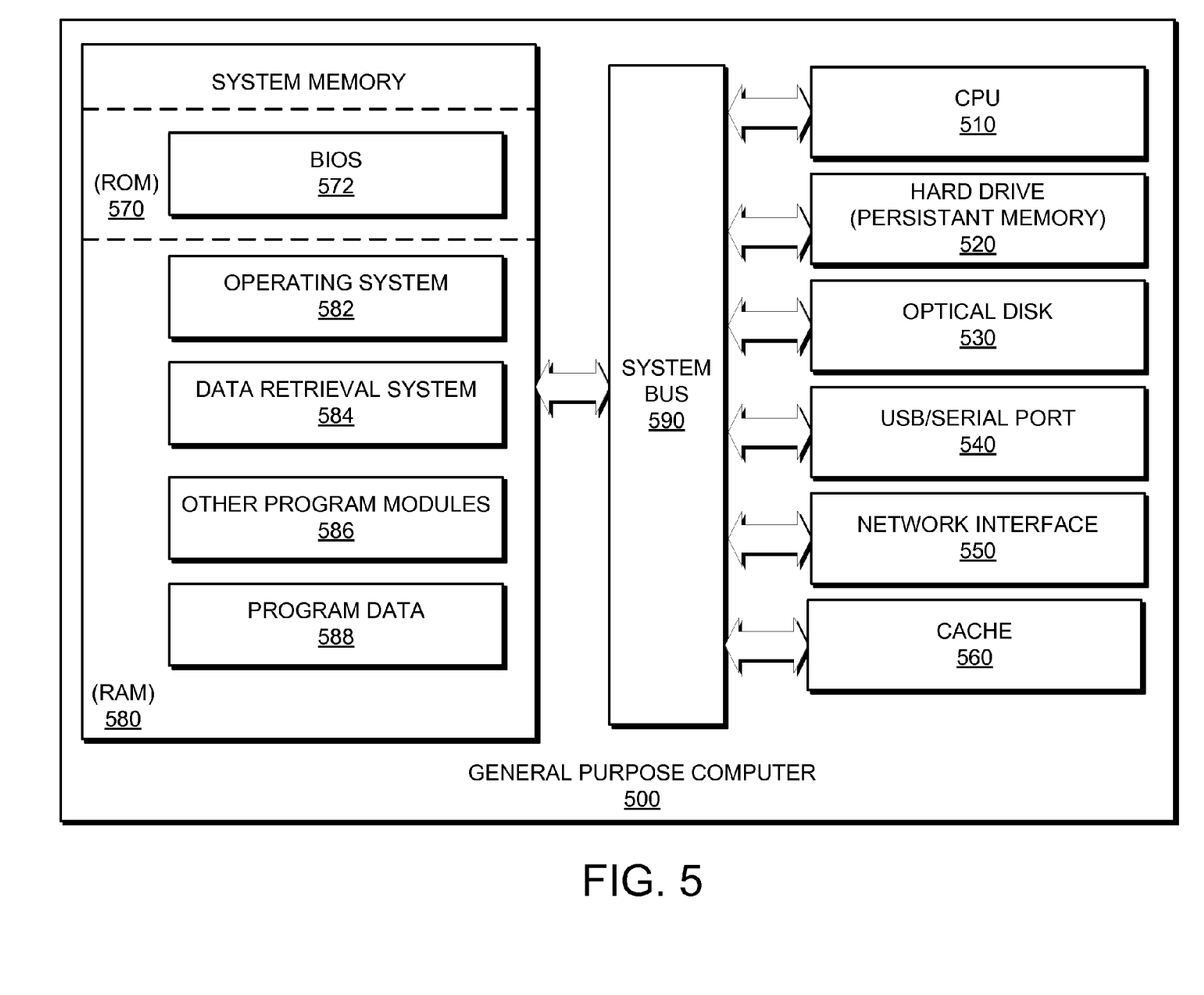
FIG. 5 depicts general computing systems capable of being used in conjunction with the present disclosure.

FIG. 5 illustrates an example general purpose computer 500 that may be useful in implementing the described technology. The example hardware and operating environment of FIG. 5 for implementing the described technology includes a computing device, such as general purpose computing device in the form of a personal computer, server, or other type of computing device. In the implementation of FIG. 5, for example, the general purpose computer 00 includes a processor 510, a cache 560, a system memory 570, 580, and a system bus 590 that operatively couples various system components including the cache 560 and the system memory 570, 580 to the processor 510. There may be only one or there may be more than one processor 510, such that the processor of general purpose computer 500 comprises a single central processing unit (CPU), or a plurality of processing units, commonly referred to as a parallel processing environment. The general purpose computer 500 may be a conventional computer, a distributed computer, or any other type of computer; the invention is not so limited.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 570 and random access memory (RAM) 580. A basic input/output system (BIOS) 572, containing the basic routines that help to transfer information between elements within the general purpose computer 500 such as during start-up, is stored in ROM 570. The general purpose computer 500 further includes a hard disk drive 520 for reading from and writing to a persistent memory such as a hard disk, not shown and an optical disk drive 530 for reading from or writing to a removable optical disk such as a CD ROM, DVD, or other optical media.

The hard disk drive 520 and optical disk drive 530 are connected to the system bus 590. The drives and their associated computer-readable media provide nonvolatile storage of computer-readable instructions, data structures, program engines and other data for the general purpose computer 500. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 570, or RAM 580, including an operating system 582, a data retrieval system application 584, one or more application programs 586, and program data 588. A user may enter commands and information into the general purpose computer 500 through input devices such as a keyboard and pointing device connected to the USB or Serial Port 540. These and other input devices are often connected to the processor 510 through the USB or serial port interface 540 that is coupled to the system bus 590, but may be connected by other interfaces, such as a parallel port. A monitor or other type of display device may also be connected to the system bus 590 via an interface, such as a video adapter 560. In addition to the monitor, computers typically include other peripheral output devices (not shown), such as speakers and printers.

The general purpose computer 500 may operate in a networked environment using logical connections to one or more remote computers. These logical connections are achieved by a network interface 550 coupled to or a part of the general purpose computer 500; the invention is not limited to a particular type of communications device. The remote computer may be another computer, a server, a router, a network PC, a client, a peer device, or other common network node, and typically includes many or all of the elements described above relative to the general purpose computer 500. The logical connections include a local-area network (LAN) a wide-area network (WAN), or any other network. Such networking environments are commonplace in office networks, enterprise-wide computer networks, intranets and the Internet, which are all types of networks.

The network adapter 550, which may be internal or external, is connected to the system bus 550. In a networked environment, programs depicted relative to the general purpose computer 500, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

The invention claimed is:

1. A method for automatically retrieving data associated with a telephone number by a telecommunications provider, comprising:
   authenticating a user as a member of an agency that is authorized to receive telephone account information from a telecommunication provider by:
   receiving an email address from the user;
   comparing a domain of the email address with a list of authorized domains; and
   emailing the user at the email address a hyperlink to a webpage for providing a telephone number;
   receiving the telephone number from the user at the webpage;
   searching for the telephone number in a telecommunications provider database;
   verifying the telephone number is a customer of the telecommunications provider;
   retrieving account information associated with the telephone number from the telecommunications provider database; and
   providing the account information to the user.

2. The method of claim 1, further comprising:
   searching for the telephone number in a secondary database when the telephone number is not found in the telecommunication provider database and retrieving the account information from the secondary database.

3. The method of claim 1, wherein verifying the telephone number is serviced by the telecommunications provider comprises analyzing a telecommunications provider name included in the retrieved account information.

4. The method of claim 1, further comprising, verifying that the telephone number is a valid United States of America telephone number by comparing the telephone number to a valid United States of America telephone number format.

5. The method of claim 1, wherein the retrieved account information comprises at least one account entry, and further comprising, formatting the retrieved account information by creating a label identifying an information contained in each of the at least one account entry.

6. The method of claim 5, wherein the at least one account entry comprises at least one of:
   an account holder name;
   a street address;
   an account payment record; and
   a telecommunications provider name.

7. A system for automatically retrieving data associated with a telephone number by a telecommunications provider comprising:
   a computing device including a processor coupled to a memory, the memory storing instructions for execution on the processor, the instructions configured to cause the processor to:
   authenticating a user as a member of an agency that is authorized to receive telephone account information from a telecommunication provider by:
   receiving an email address from the user;
   comparing a domain of the email address with a list of authorized domains; and
   emailing the user at the email address a hyperlink to a webpage for providing a telephone number;
   receiving the telephone number from the user at the webpage;
   searching for the telephone number in a telecommunications provider database;
   verifying the telephone number is a customer by the telecommunications provider;
   retrieving account information associated with the telephone number from the telecommunications provider database; and
   providing the account information to the user.

8. The system of claim 7, further comprising:
   searching for the telephone number in a secondary database when the telephone number is not found in the telecommunication provider database and retrieving the account information from the secondary database.

9. The system of claim 7, wherein verifying the telephone number is serviced by the telecommunications provider comprises analyzing a telecommunications provider name included in the retrieved account information.

10. The system of claim 7, further comprising, verifying that the telephone number is a valid United States of America telephone number by comparing the telephone number to a valid United States of America telephone number format.

11. The system of claim 7, wherein the retrieved account information comprises at least one account entry, and further comprising, formatting the retrieved account information by creating a label identifying an information contained in each of the at least one account entry.

12. The system of claim 7, wherein the at least one account entry comprises at least one of:
   an account holder name;
   a street address;
   an account payment record; and
   a telecommunications provider name.

13. A method for automatically retrieving data associated with a telephone number by a telecommunications provider, comprising:
   authenticating a user as a member of an agency that is authorized to view account information by:
   receiving an email address from the user;
   comparing a domain of the email address with a list of authorized domains; and
   emailing the user at the email address a hyperlink to a webpage for providing the telephone number;
   receiving from the user at the webpage the telephone number;
   querying a first database for the telephone number;
   verifying the telephone number is a customer of the telecommunications provider;
   retrieving an account information associated with the telephone number; and
   sending the account information to the user.

14. The method of claim 13, further comprising searching for the telephone number in a secondary database when the telephone number is not found in the telecommunication provider database and retrieving the account information from the secondary database.

15. The method of claim 13, further comprising, verifying that the telephone number is a valid United States of America telephone number by comparing the telephone number to a valid United States of America telephone number format.

16. The method of claim 13, further comprising, wherein the retrieved account information comprises at least one account entry, and further comprising, formatting the retrieved account information by creating a label identifying an information contained in each of the at least one account entry.

17. The method of claim 13, wherein the account information comprises at least one of an account holder's, a street address, and a payment record.

* * * * *